(12) United States Patent
Gluchowski et al.

(10) Patent No.: US 12,372,278 B2
(45) Date of Patent: Jul. 29, 2025

(54) HEAT EXCHANGER WITH HORIZONTALLY POSITIONED RECEIVER DRIER

(71) Applicant: Valeo Autosystemy Sp. z o.o., Skawina (PL)

(72) Inventors: Marek Gluchowski, Skawina (PL); Andrzej Jugowicz, Skawina (PL); Wojciech Ochala, Skawina (PL)

(*) Notice: Subject to any disclaimer, the term of this patent is extended or adjusted under 35 U.S.C. 154(b) by 75 days.

(21) Appl. No.: 17/794,377

(22) PCT Filed: Jan. 21, 2021

(86) PCT No.: PCT/EP2021/051334
§ 371 (c)(1),
(2) Date: Jul. 21, 2022

(87) PCT Pub. No.: WO2021/148536
PCT Pub. Date: Jul. 29, 2021

(65) Prior Publication Data
US 2023/0046966 A1 Feb. 16, 2023

(30) Foreign Application Priority Data
Jan. 22, 2020 (EP) .................................... 20461505

(51) Int. Cl.
*F25B 39/00* (2006.01)
*F25B 39/04* (2006.01)
*F25B 43/00* (2006.01)

(52) U.S. Cl.
CPC ............ *F25B 39/00* (2013.01); *F25B 43/003* (2013.01); *F25B 39/04* (2013.01);
(Continued)

(58) Field of Classification Search
CPC .............. F25B 39/00; F25B 2339/0446; F25B 2339/0443; F25B 2339/0441; F25B 39/04; F25B 43/003
See application file for complete search history.

(56) References Cited

U.S. PATENT DOCUMENTS 5,910,165 A * 6/1999 Haramoto .......... B01D 53/0415
96/108
7,832,230 B2 * 11/2010 Feldhaus ............... F25B 43/003
62/509
(Continued)

FOREIGN PATENT DOCUMENTS

CN 209326150 U 8/2019
DE 19645502 A1 5/1997
(Continued)

OTHER PUBLICATIONS

Translated_Szostek (Year: 2015).*
(Continued)

*Primary Examiner* — Elizabeth J Martin
(74) *Attorney, Agent, or Firm* — Osha Bergman Watanabe & Burton LLP

(57) ABSTRACT

A condenser includes a first and a second core and a receiver drier, the first and the second cores include a first and a second pair of collectors respectively for heat exchange fluid. At least the first pair of collectors are arranged substantially vertically. The receiver drier includes a tubular casing, an inlet and an outlet port, a desiccant section and a suction tube. The inlet and outlet ports are configured at opposite lateral ends of the tubular casing. The desiccant section is configured between the lateral ends of the tubular casing. The suction tube configures fluid communication between the desiccant section and the outlet port. The receiver drier is disposed horizontally. The suction tube enables receiving of the fluid from a lower portion of the tubular casing along the vertical direction and upstream of the suction tube in direction of fluid flow in the receiver drier.

11 Claims, 7 Drawing Sheets

(52) U.S. Cl.
CPC .............. *F25B 2339/0441* (2013.01); *F25B 2339/0443* (2013.01); *F25B 2339/0446* (2013.01)

(56) References Cited

U.S. PATENT DOCUMENTS

| | | |
|---|---|---|
| 2008/0156012 A1 | 7/2008 | Feldhaus et al. |
| 2020/0009501 A1* | 1/2020 | Sussman ............... F25B 43/003 |

FOREIGN PATENT DOCUMENTS

| | | | |
|---|---|---|---|
| DE | 10104374 A1 | 8/2002 | |
| DE | 10226851 A1 | 1/2004 | |
| DE | 102004022714 A1 | 12/2005 | |
| EP | 1202007 A1 | 5/2002 | |
| EP | 1505358 A2 | 2/2005 | |
| EP | 2835608 A1 * | 2/2015 | ........... F28D 1/0435 |
| JP | H11257799 A | 9/1999 | |
| JP | 2008151420 A | 7/2008 | |
| KR | 2011105561 A * | 9/2011 | ............... F25B 39/04 |

OTHER PUBLICATIONS

Translated_Park (Year: 2011).*
International Search Report and Written Opinion in corresponding International Application No. PCT/EP2021/051334, mailed Mar. 30, 2021 (12 pages).
Office Action in corresponding Chinese Application No. 202180010432.9, dated Mar. 19, 2025 (16 pages).

* cited by examiner

HEAT EXCHANGER WITH HORIZONTALLY POSITIONED RECEIVER DRIER

The present invention relates to a heat exchanger with a receiver drier, more particularly, the present invention relates to a heat exchanger with a receiver drier that is horizontally positioned with respect to the heat exchanger for a vehicle Heating Ventilation and Air-conditioning unit.

Conventional air conditioning system, for example for a vehicle cabin, includes a condenser, an evaporator, an expansion device, a compressor and a heater. The compressor pumps refrigerant gas up to a high pressure and temperature. Thereafter, refrigerant gas enters the condenser, where refrigerant gas rejects heat energy to external ambient (through ambient air or a specific low temperature coolant circuit), is cooled, and condenses into liquid phase. Thereafter, the expansion valve regulates refrigerant liquid to flow at proper rate, reducing its pressure due its expansion, and finally, the cooled liquid refrigerant flows to the evaporator, where the cooled liquid refrigerant is evaporated. As the liquid refrigerant evaporates, the refrigerant extracts or absorbs heat energy from air inside an enclosure to be conditioned, specifically, the vehicle cabin in case of a vehicle air conditioning system and returns to the compressor, and the above cycle repeats. In the process, the heat extracted from inside the vehicle cabin and rejected to outside vehicle cabin, results in cooling of air inside the vehicle cabin.

Generally, the conventional air conditioning system configured with an expansion valve is also configured with a receiver drier that is disposed in a high-pressure section of the air conditioning system, usually located between a condenser and the expansion valve in the air conditioning loop. Generally, a conventional heat exchanger, particularly, the condenser is configured with the receiver drier along an outlet side of the condenser, particularly, along a length of an outlet collector of a pair of collectors of the condenser. The receiver drier includes a tubular casing in form of an airtight container with an inlet and an outlet. The inlet receives liquid refrigerant along with some uncondensed refrigerant, debris and incompressible moisture, if any from a first pass defining a condensing section of the condenser via a first section of the outlet collector. Whereas, the outlet delivers the liquid refrigerant from which incompressible moisture and debris is removed, to a second pass defining the sub-cooling section of the condenser via a second section of the outlet collector.

However, there are various drawbacks associated with a condenser with such configuration of the receiver drier. Particularly, the condenser with such conventional configuration of receiver drier is bulky and faces packaging issues due to limited space in a front of the vehicle, the packaging issue is further aggravated in case the vehicle is an electric vehicle, in which the front portion of the electric vehicle is utilized as utility such as for example, a cargo-space. Certain prior art discloses condenser with receiver drier that is orthogonally and horizontally disposed with respect to the collectors that are laterally disposed. However, such condenser exhibits reduced performance in case vehicle is subjected to angular displacement, for example, when one side of the vehicle is elevated due to vehicle traversing or parked on an inclined/uneven road or with one side thereof on a pavement or raised area. Specifically, in case of the conventionally known condenser configured with horizontally disposed receiver drier, angular displacement of the vehicle detrimentally affects refrigerant supply to a sub-cooling section of the condenser. More specifically, in case of the conventionally known condenser, configured with horizontally disposed receiver drier, the refrigerant supply to the sub-cooling section is insufficient in case of angular displacement of the vehicle. Further, the conventional receiver drier fails to prevent refrigerant vapour from reaching the sub-cooling section of the condenser along with the condensed refrigerant, thereby adversely affecting the efficiency and performance of the condenser.

Accordingly, there is a need for a condenser with receiver drier that can be configured horizontally with respect to collectors of the condenser, to attain a compact configuration and enable packaging thereof in a limited space in front of a vehicle. Further, there is a need for a condenser with horizontally positioned receiver drier that ensures high efficiency and performance of the condenser by supplying liquid refrigerant to a sub-cooling section of the condenser and preventing refrigerant vapour from reaching the sub-cooling section along with the condensed refrigerant. Further, there is a need for a condenser with horizontally positioned receiver drier that ensures high efficiency and performance of the condenser by ensuring sufficient supply of the condensed refrigerant to a sub-cooling section of the condenser, irrespective of the angular displacement of the vehicle. Specifically, there is need for a condenser with a horizontally positioned receiver drier that mitigates any impact of angular displacement of the vehicle on supply of condensed refrigerant to the sub-cooling section of the condenser and as such on performance of the condenser.

An object of the present invention is to provide a condenser with a receiver drier that can be horizontally positioned with respect to collectors of the condenser, to enable packaging thereof in a limited space in front of a vehicle.

Another object of the present invention is to provide a condenser with a receiver drier that obviates the drawbacks associated conventional condenser with horizontally positioned receiver drier.

Still another object of the present invention is to provide a condenser with a horizontally positioned receiver drier that ensures high efficiency and performance of the condenser by preventing refrigerant vapour from reaching a sub-cooling section along with the condensed refrigerant.

Another object of the present invention is to provide a condenser with a horizontally positioned receiver drier that ensures sufficient supply of the condensed refrigerant to a sub-cooling section of the condenser, irrespective of the angular displacement of the vehicle.

Yet another object of the present invention is to provide a condenser with a horizontally positioned receiver drier that mitigates any impact of angular displacement of the vehicle on performance of the condenser.

In the present description, some elements or parameters may be indexed, such as a first element and a second element. In this case, unless stated otherwise, this indexation is only meant to differentiate and name elements which are similar but not identical. No idea of priority should be inferred from such indexation, as these terms may be switched without betraying the invention. Additionally, this indexation does not imply any order in mounting or use of the elements of the invention.

A heat exchanger to be mounted on a vehicle is disclosed in accordance with an embodiment of the present invention. The heat exchanger includes a first core, a second core and a receiver drier. The first core and the second core includes a first pair of collectors and a second pair of collectors respectively for heat exchange fluid. At least the first pair of collectors being arranged substantially vertically. The receiver drier is inter-positioned fluidly between the cores and includes, a tubular casing, an inlet port, an outlet port, a desiccant section and a suction tube. The inlet port and the outlet port are configured at opposite lateral ends of the tubular casing. The desiccant section is configured between the lateral ends and receives desiccant material therein. The suction tube configures fluid communication between the desiccant section and the outlet port. The receiver drier is disposed horizontally. The suction tube is configured to enable receiving of the fluid from a lower portion of the tubular casing defined below a central axis O of the tubular casing and upstream of the suction tube in direction of fluid flow in the receiver drier.

Generally, the second core is disposed parallel to and behind the first core.

Specifically, the desiccant section is defined between a pair of perforated end plates received in the tubular casing, the pair of perforated end plates permit ingress, egress and fluid flow through the desiccant section.

Also, the outlet port is in fluid communication with and supplies condensed refrigerant egressing the tubular casing to the second core through a jumper line.

Generally, the desiccant material is silica gel.

Further, the heat exchanger includes at least one restraining element received inside the tubular casing and downstream of the desiccant section in a fluid flow direction inside the receiver drier to position and maintain the suction tube below the central axis O of the tubular casing.

Specifically, the at least one restraining element is provided with either one of an aperture and a cut-out to receive the suction tube to position and maintain the suction tube below the central axis O of the tubular casing.

Further, the at least one restraining element is provided with at least one opening to permit fluid flow across the at least one restraining element.

Preferably, the desiccant section with desiccant material received therein is positioned between filtering pads and corresponding perforated plates positioned inside the tubular casing.

In accordance with an embodiment of the present invention, the desiccant material is in the form of a desiccant bag retained inside the tubular casing between a distal end of the desiccant section and at least one of a filter body and a first lateral end of the pair of lateral ends with at least a portion of the desiccant bag received in the desiccant section.

Specifically, an inlet to the suction tube facing the desiccant section is disposed along rotation centre of the vehicle, at the lower portion of the tubular casing to receive the fluid inside the suction tube irrespective of vehicle orientation.

Generally, the inlet to the suction tube is provided with a nozzle of reduced dimension compared to rest of the suction tube to promote suction of the fluid inside the suction tube.

Other characteristics, details and advantages of the invention can be inferred from the description of the invention hereunder. A more complete appreciation of the invention and many of the attendant advantages thereof will be readily obtained as the same becomes better understood by reference to the following detailed description when considered in connection with the accompanying figures, wherein:

FIG. 1b illustrates an isometric rear view of the condenser with the receiver drier of FIG. 1a;

Figure 6:
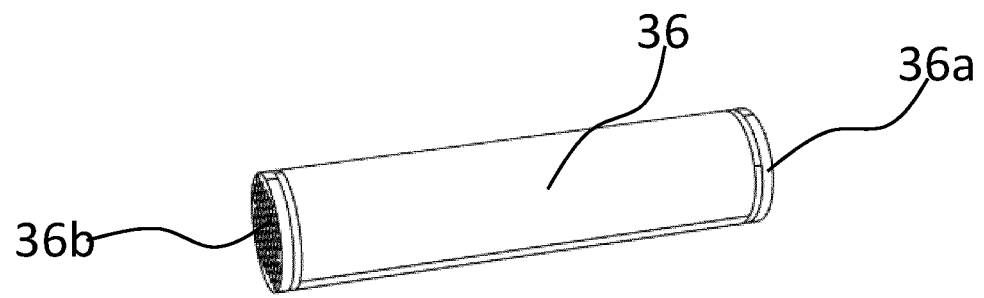
Figure 7:
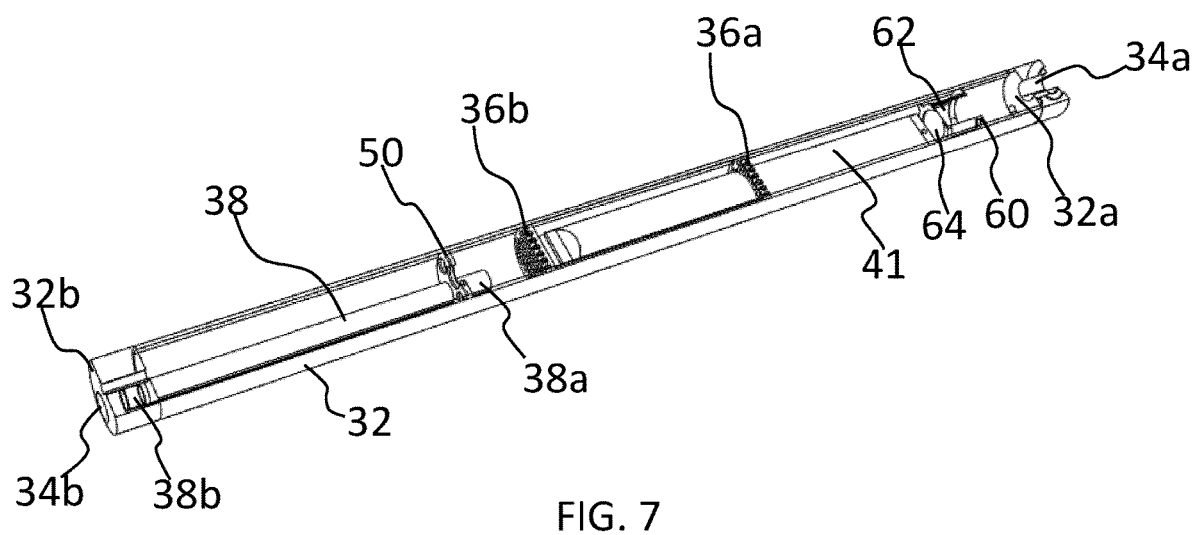
Figure 8:
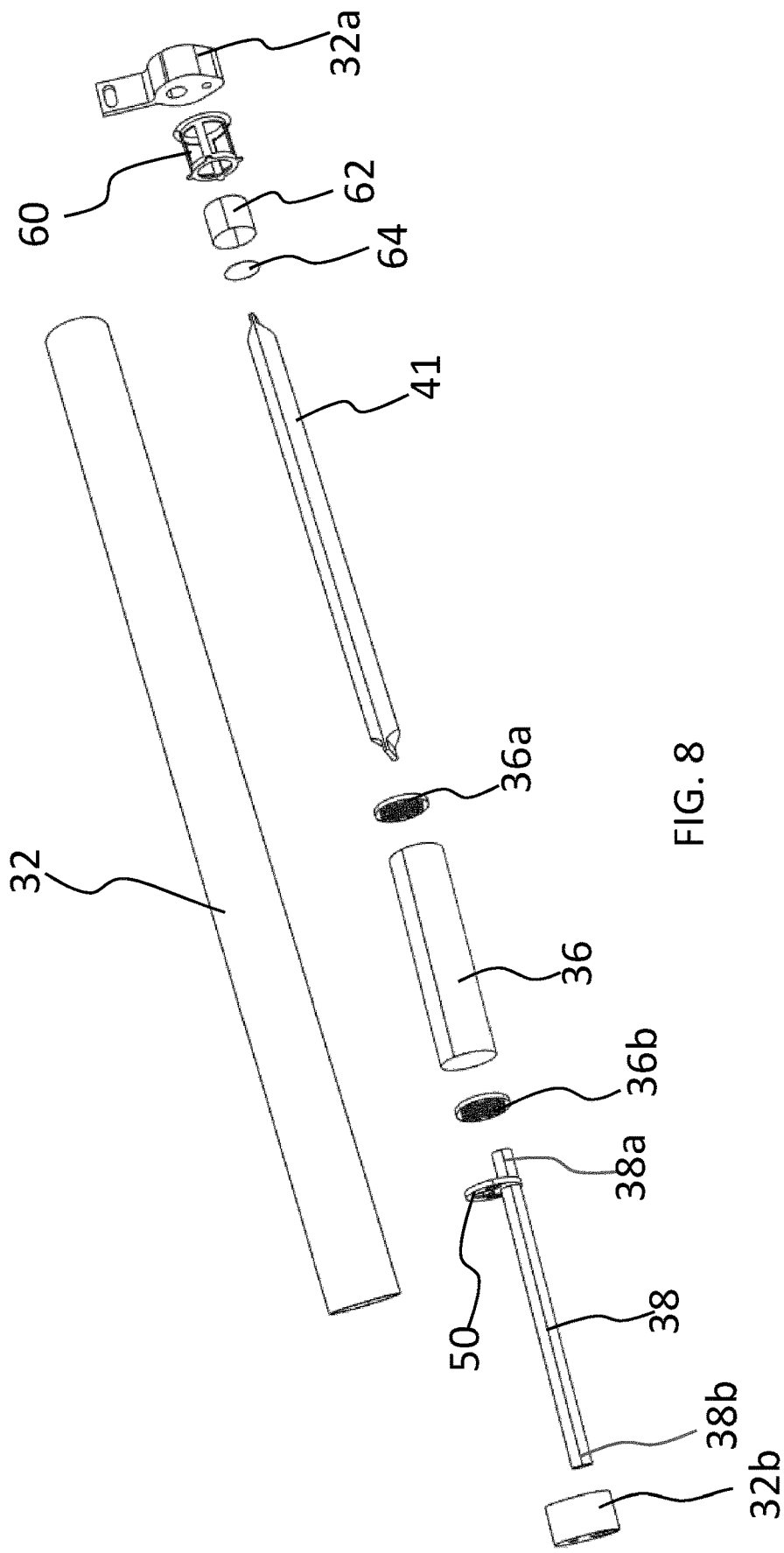

FIG. 6 illustrates a desiccant section defined between a pair of perforated end plates in accordance with an embodiment of the present invention; and FIG. 7 illustrates an isometric sectional view depicting internal details of a receiver drier in accordance with yet another embodiment of the present invention, wherein desiccant material is received inside a desiccant bag and at least a portion of the desiccant bag is received in the desiccant section; and FIG. 8 illustrates an exploded view of the receiver drier of FIG. 7.

It must be noted that the figures disclose the invention in a detailed enough way to be implemented, said figures helping to better define the invention if needs be. The invention should however not be limited to the embodiment disclosed in the description.

Forthcoming description explains the present invention with example of a condenser with a receiver drier configured horizontally and orthogonally with respect to collectors of the condenser, wherein horizontal configuration of the receiver drier addresses packaging issues associated with packaging of condenser-receiver drier assembly in a limited space in front of the vehicle. The receiver drier includes a tubular casing, wherein inlet and outlet ports configured on the tubular casing are strategically configured with respect to each other to prevent refrigerant vapour from egressing the receiver drier and reaching a sub-cooling section of the condenser along with condensed refrigerant. The receiver drier also includes a suction tube that is so positioned and maintained with respect to a cross section of the tubular casing that sufficient condensed refrigerant is supplied to a sub-cooling section of the condenser irrespective of the angular displacement of the vehicle. However, the present invention is also applicable for any other device configured on a vehicle and that is required to be disposed horizontally to address packaging issues that is required to efficiently separate vapour from liquid-vapour mixture received therein and that ensures sufficient supply of separated liquid without vapours to a next element of a system of which the device is a part of irrespective of the angular displacement of the vehicle.

Figure 1A:
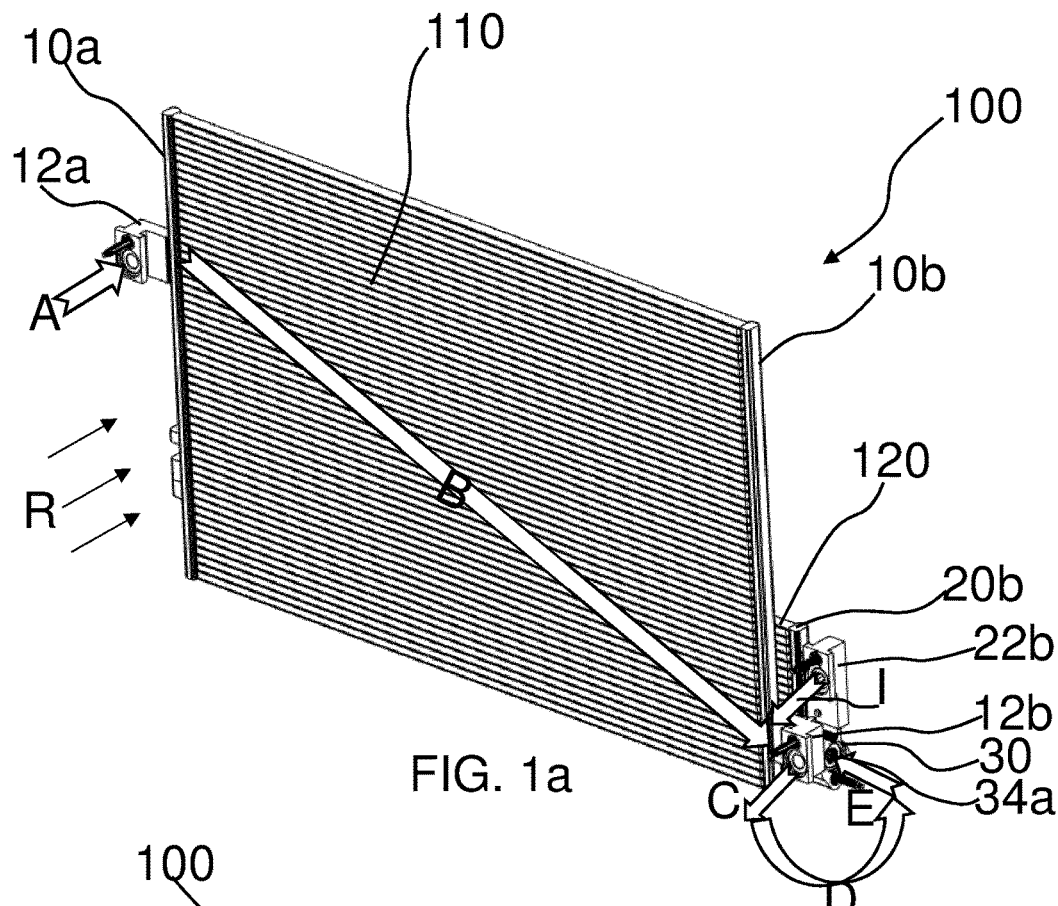
FIG. 1a illustrates an isometric front view of a condenser with a receiver drier horizontally positioned with respect to collectors of the condenser that are substantially vertical, in accordance with an embodiment of the present invention.

FIG. 1a illustrates an isometric front view of a heat exchanger, particularly, a condenser 100 for an air conditioning system for a vehicle. The condenser includes a receiver drier 30 horizontally positioned with respect to a first pair of collectors 10a, 10b and a second pair of collectors 20a and 20b of the condenser 100, in accordance with an embodiment of the present invention. At least one of the pair of collectors being arranged substantially vertically. The condenser 100 includes a first core 110, a second core 120 and the receiver drier 30. The first core 110 is configured with the first pair of collectors 10a and 10b for distributing and collecting the refrigerant through heat exchange elements of the first core 110. The second core 120 is configured with the second pair of collectors 20a and 20b for distributing and collecting the refrigerant through heat exchange elements of the second core 120. At least the first pair of collectors 10a and 10b are arranged substantially vertically. Generally, the second core 120 is disposed parallel to and behind the first core 110 to impart compact configuration to the condenser 100 and address packaging issues. Specifically, the first core 110 is disposed at a front of the vehicle and is the first to come in contact with the ram air and the second core 120 is disposed behind, particularly, downstream of the first core 110 in ram air flow direction depicted by arrows R. The first core 110 receives refrigerant vapours and delivers condensed refrigerant along with some incompressible moisture and uncondensed refrigerant, if any, whereas the second core 120 is disposed downstream of and is connected to outlet of the receiver drier 30. The second core 120 sub-cools the condensed refrigerant from the first core 110 from which incompressible moisture and uncondensed refrigerant is removed by the receiver drier 30. However, the present invention is not limited to any particular configuration and placement of the second core 120 with respect to the first core 110, as far as cores are arranged in compact configuration to address packaging issues and the second core 120 sub-cools the condensed refrigerant that is separated by passing through the receiver drier 30. The receiver drier 30 includes a tubular casing 32, an inlet port 34a, an outlet port 34b, a desiccant section 36 and a suction tube 38.

The first pair of collectors 10a and 10b are disposed at lateral sides of the first core 110, whereas the second pair of collectors 20a and 20b is disposed at lateral sides of the second core 120. The first core 110 receives refrigerant vapour from a first inlet collector 10a of the first pair of collectors 10a and 10b. The first inlet collector 10a includes a first inlet block 12a configured thereon and in fluid communication therewith. The first inlet block 12a supplies refrigerant vapour to the first inlet collector 10a. More specifically, referring to the FIG. 1a, the refrigerant vapour enters the first inlet collector 10a from the first inlet block 12a as illustrated by arrow A. Thereafter, the first inlet collector 10a in conjunction with corresponding header distributes the vapour refrigerant in the first core 110. As the vapour refrigerant flows through the heat exchange elements of the first core 110 as depicted by the arrow B, the vapour refrigerant is condensed. The condensed refrigerant egressing the first core 110 is collected by a first outlet collector 10b. The first outlet collector 10b includes a first outlet block 12b configured thereon and in fluid communication therewith. The condensed refrigerant, including some refrigerant vapours and incompressible moisture, if any egresses through the first outlet block 12b as depicted by the arrow C. Thereafter, the condensed refrigerant along with some incompressible moisture and uncondensed refrigerant vapours, if any enters the tubular casing 32 of the receiver drier 30 through the inlet port 34a configured on a corresponding lateral end 32a closing the end of the tubular casing 32 and in flow direction depicted by arrow E. The first outlet block 12b is in fluid communication with the inlet port 34a and the condensed refrigerant, along with some incompressible moisture and uncondensed refrigerant vapours flows from the first outlet block 12b to the inlet port 34a as depicted by arrow D. The fluid flow from the first outlet block 12b to the inlet port 34a is depicted by arrows C, D and E.

Figure 1B:
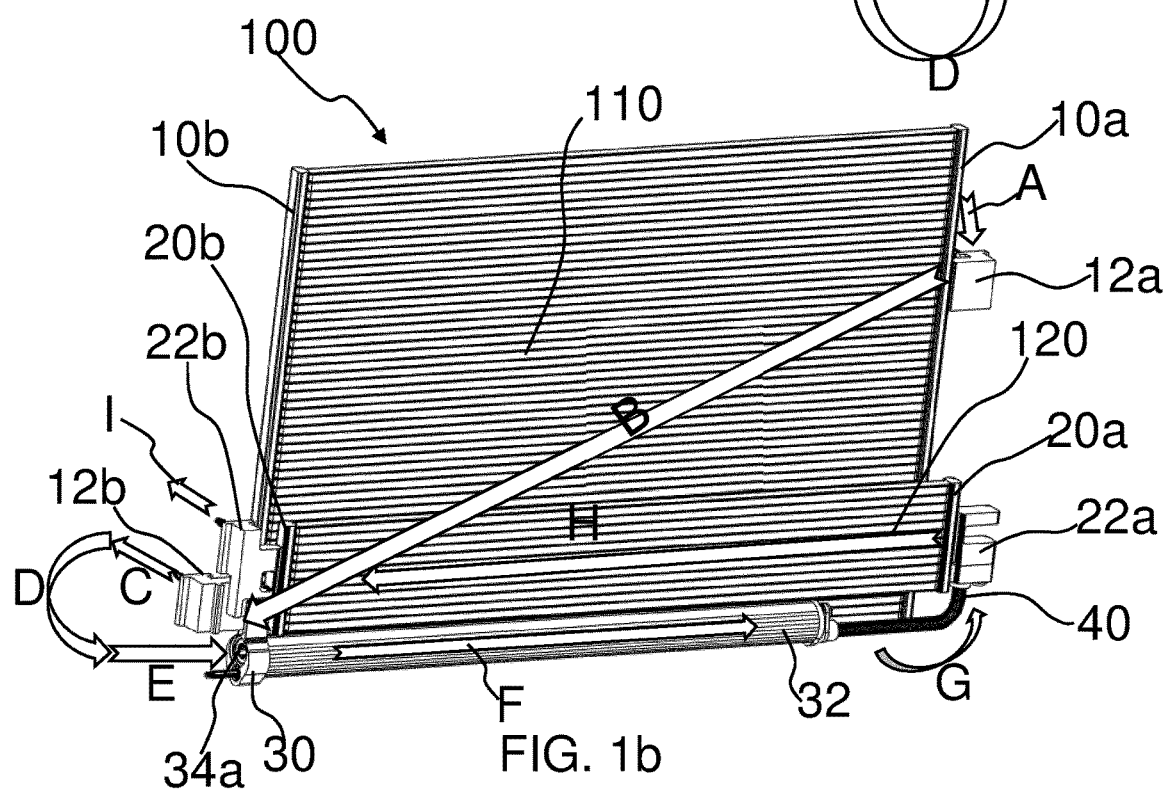

Referring to FIG. 1b, the tubular casing 32 includes the lateral ends 32a and 32b that at closed at the extreme ends. The tubular casing 32 may include lateral end plates for closing the opposite lateral ends 32a and 32b or the opposite lateral ends 32a and 32b are closed ends. The condensed refrigerant, along with some incompressible moisture and refrigerant vapours, if any enters the tubular casing 32 of the receiver drier 30 and passes there through as depicted by the arrow F. Inside the receiver drier 30, desiccant material held in the desiccant section 36 absorbs the incompressible moisture to prevent damage to critical elements such as compressor disposed downstream of the condenser 100 due to moisture reaching the critical elements. Further, referring to the FIG. 2a and FIG. 2b, the inlet port 34a and the outlet port 34b are configured respectively above and below a central axis O of the tubular casing 32. Specifically, the central axis O of the horizontally disposed tubular casing 32 is defined as axis extending along axial length of the tubular casing 32 and passing through a centre of cross section of the tubular casing 32. More specifically, in case the tubular casing 32 is of circular cross section, the central axis O pass through the centre of circular cross section of the tubular casing 32. With such configuration, liquid refrigerant egresses out of the receiver drier 30 and is transferred to the second core 120 for sub-cooling thereof, while vapour refrigerant is prevented from egressing the receiver drier 30 and reaching the second core 120. The internal details of the receiver drier 30 as well as configuration of the desiccant section 36, the strategic placement of the inlet port 34a and the outlet port 34b is elaborately defined in the forthcoming description. The condensed refrigerant with incompressible moisture and vapour refrigerant removed therefrom in the receiver drier 30 is transferred to a second inlet block 22a configured on a second inlet collector 20a of the second pair of collectors 20a and 20b via a jumper line 40 as depicted by arrow G. The second inlet block 22a is in fluid communication with the second inlet collector 20a and supplies the condensed refrigerant to the second inlet collector 20a. The second inlet collector 20a distributes the condensed refrigerant received thereby to the second core 120. As the condensed refrigerant passes through the second core along arrow H, the condensed refrigerant is sub-cooled. The sub-cooled refrigerant is collected in a second outlet collector 20b of the second pair of collectors 20a and 20b. The second outlet collector 20b includes a second outlet block 22b configured thereon and in fluid communication therewith. The sub-cooled refrigerant egresses the second outlet block 22b along arrow I as illustrated in the FIG. 1b.

Figure 2A:
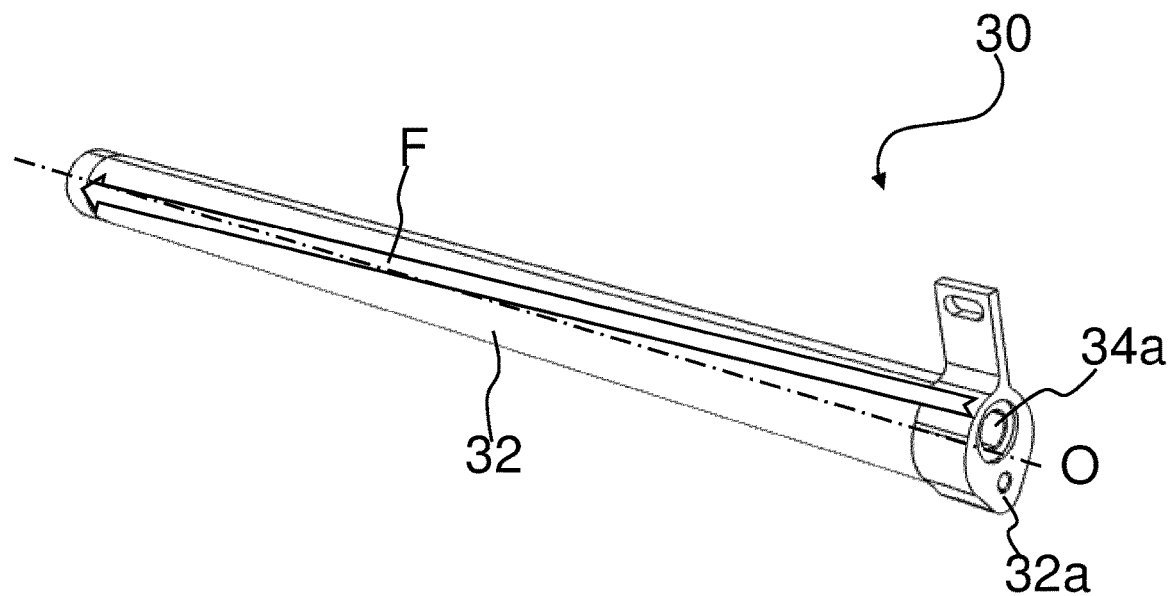
FIG. 2a illustrates an isometric view of the receiver drier of FIG. 1b.
Figure 2B:
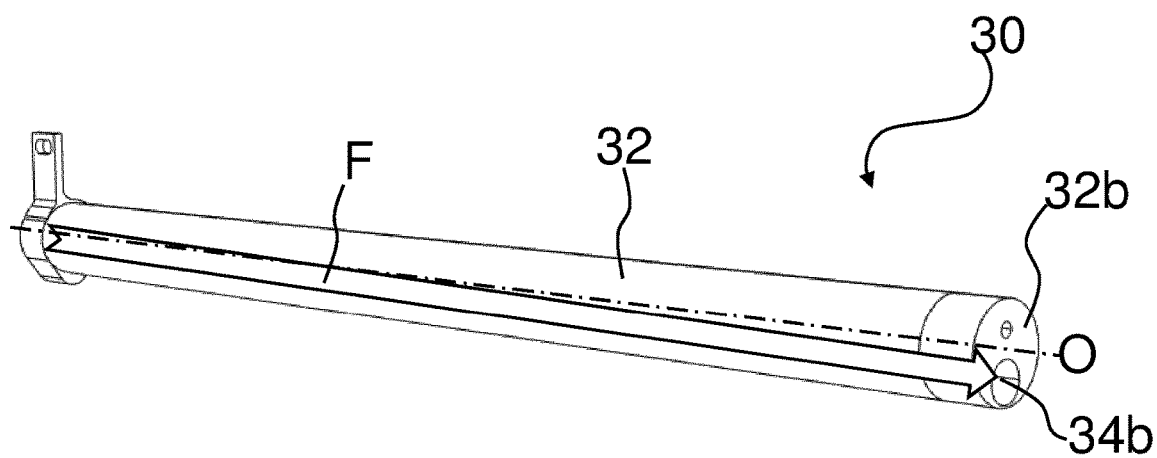
FIG. 2b illustrates another isometric view of the receiver drier of FIG. 1b.

The receiver drier 30 is disposed horizontally and orthogonality with respect to the first pair of collectors 10a and 10b. Such configuration of the receiver drier 30 enables packaging of the condenser 100 along with the receiver drier 30 in a limited space in front of the vehicle. FIG. 2a and FIG. 2b depicts isometric views the tubular casing 32 of the receiver drier 30. The tubular casing is generally of a one-piece configuration. The lateral ends 32a and 32b of the tubular casing 32 can be closed by using lateral end plates. However, the present invention is not limited to any particular configuration of the tubular casing 32. The inlet port 34a and the outlet port 34b are configured at the opposite lateral ends 32a and 32b of the tubular casing 32. The inlet port 34a and the outlet port 34b are configured respectively above and below the central axis O of the tubular casing 32. More specifically, the condensed refrigerant being heavier, settles at the bottom of the tubular casing 32 and egresses through the outlet port 34b that is disposed below the central axis O and closer to the bottom of the tubular casing 32. Such configuration provides easy escape of the condensed refrigerant from the outlet port 34b. Whereas the vapour refrigerant being lighter remains at the top of the tubular casing 32 away from the outlet port 34b and as such is retained inside the tubular casing 32 and separates out from the condensed refrigerant. With such configuration, only liquid refrigerant egresses from the receiver drier 30 to be transferred to the second core 120 for sub-cooling thereof, while vapour refrigerant is prevented from egressing the receiver drier 30 and reaching the second core 120. Such configuration effective separation of the liquid refrigerant and the vapour refrigerant.

Figure 3A:
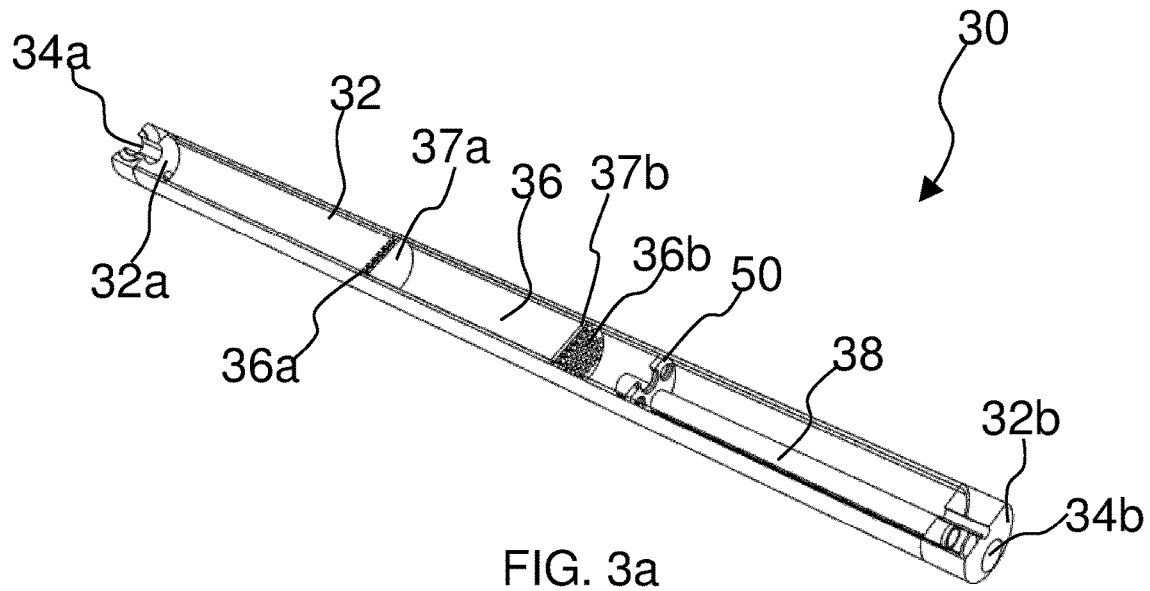
FIG. 3a illustrates a sectional view depicting internal details of the receiver drier of FIG. 2b.
Figure 3B:
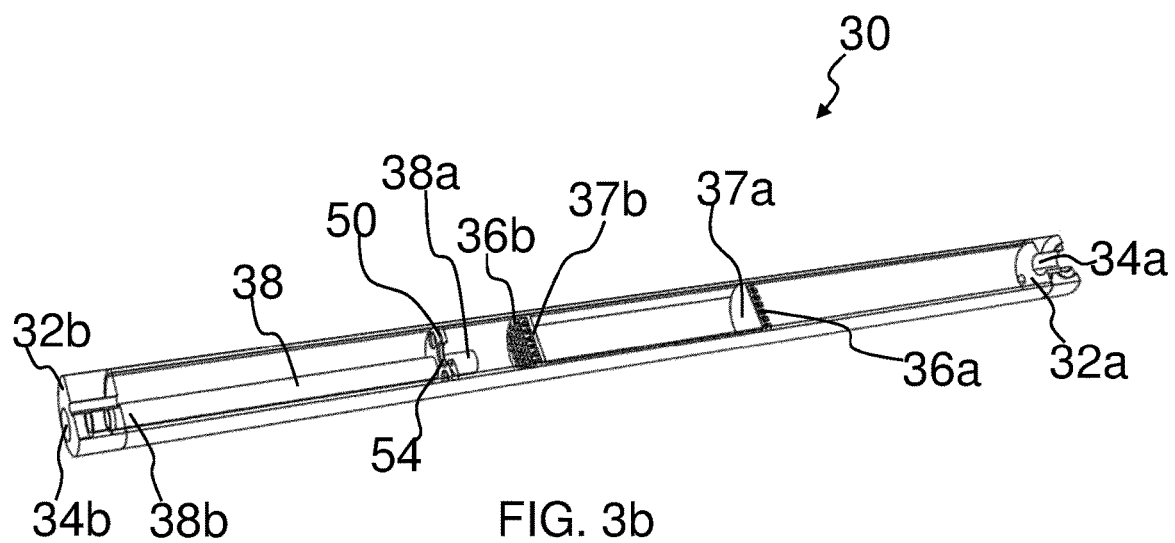
FIG. 3b illustrates another sectional view depicting internal details of the receiver drier of FIG. 2b.
Figure 4:
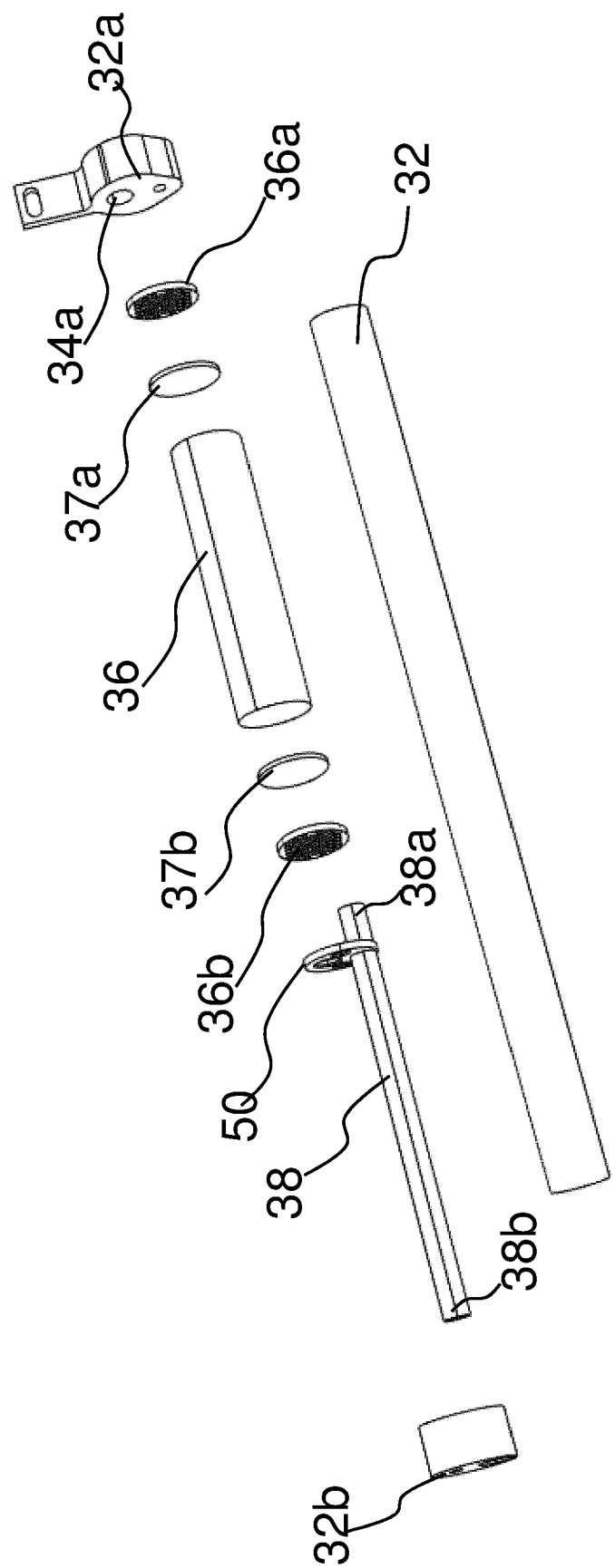
FIG. 4 illustrates an exploded view of the receiver drier of FIG. 2b.

FIG. 3a and FIG. 3b illustrate sectional views depicting internal details of the receiver drier 30. The desiccant section 36 is configured between the lateral ends 32a and 32b and receives desiccant material that absorbs moisture from the refrigerant passing there through. In accordance with an embodiment of the present invention, the desiccant section 36 is centrally disposed between the lateral ends 32a and 32b of the tubular casing 32. In accordance with an embodiment, the desiccant material is silica gel. However, the present invention is not limited to any particular desiccant material received in the desiccant section 36 as far as the desiccant material is capable of absorbing moisture from the condensed refrigerant passing there through. The desiccant section 36 is defined between a pair of perforated end plates 36a and 36b received in the tubular casing 32. The perforated end plates 36a and 36b respectively permit ingress of the refrigerant into the desiccant section 36 and egress of refrigerant from the desiccant section 36 after passing through the desiccant material held in the desiccant section 36. In a preferred embodiment of the present invention as illustrated in FIG. 3a-FIG. 4, the desiccant section 36 with the desiccant material received therein is positioned between filtering pads 37a and 37b and the perforated plates 36a and 36b received inside the tubular casing 32. The filtering pads 37a and 37b perform filtering action and allow fluid flow there through but retain the desiccant material there-between. In one embodiment of the present invention, the desiccant section 36 can be in form of polyester bag filled with desiccant material and tightly gripped inside the tubular casing 32. In accordance with an embodiment as illustrated in FIG. 7 and FIG. 8, the desiccant material is in received in a desiccant bag 41. The desiccant bag 41 is retained inside the tubular casing 32 between a distal end of the desiccant section 36 and at least one of a filter body 60 and a first lateral end 32a of the pair of lateral ends 32a and 32b with at least a portion of the desiccant bag 41 received in the desiccant section 36. In one embodiment, the desiccant bag 41 is connected to the filter body 60 by gluing or mechanical connection means 64. In another embodiment, the desiccant bag 41 is not connected to the filter body 60 and is pushed inside the tubular casing 32 by the filter body 60. The filter body 60 receives a filter element 62 that perform filtering action. At least one of the perforated end plates 36a and 36b include an aperture to allow entry and receiving of at least a portion of the desiccant bag 41 in the desiccant section 36. However, the present invention is not limited to any particular configuration of the desiccant section 36 and placement of the desiccant section 36 inside the tubular casing 32 as far as the desiccant section 36 is capable of receiving the desiccant material therein and cause the condensed refrigerant to compulsorily flow through the desiccant material held therein.

Figure 5:
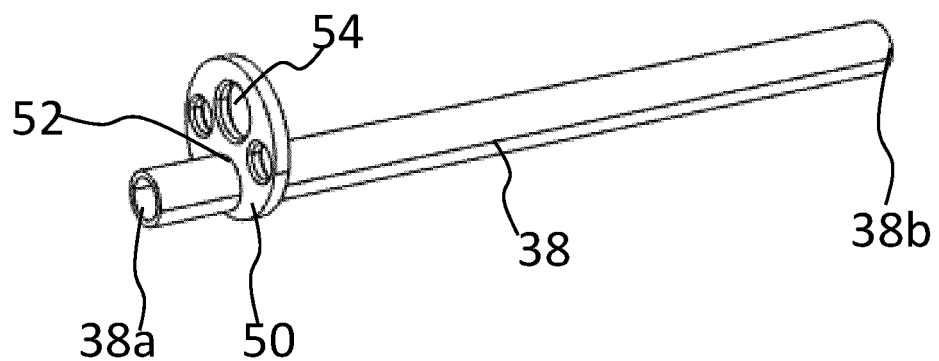
FIG. 5 illustrates an isometric view of a suction tube along with a retraining element in accordance with an embodiment of the present invention.

The suction tube 38 configures fluid communication between the desiccant section 36 and the outlet port 34b. More specifically, the suction tube 38 is positioned in such a manner that one end of the suction tube 38, particularly, an inlet 38a of the section tube 38 is either facing or abutting against the perforated end plate 36b through which the condensed refrigerant egresses the desiccant section 36. Specifically, the inlet 38a to the suction tube 38 that is proximal to and facing the desiccant section 36 is disposed along rotation centre of the vehicle, at the lower portion of the tubular casing and receives the fluid inside the suction tube 38 irrespective of vehicle orientation. In addition or alternatively, the inlet 38a may be placed in the middle between the opposite lateral ends 32a and 32b of the tubular casing 32. In accordance with an embodiment of the present invention, the suction tube 38 and accordingly, the inlet 38a is of oval or circular cross section. In accordance with an embodiment of the present invention, the inlet 38a to the suction tube 38 is provided with a nozzle of reduced dimension compared to rest of the suction tube 38 to promote suction of the fluid inside the suction tube 38. Whereas, the other end of the suction tube 38, particularly an outlet 38b of the suction tube 38 is connected to the outlet port 34b. The suction tube 38 is positioned and maintained below the central axis O of the tubular casing 32. The suction tube 38 is configured to enable receiving of the fluid from a lower portion of the tubular casing 32 with respect to and below the central axis O of the tubular casing 32. Specifically, the receiver drier 30 includes at least one restraining element 50 received inside the tubular casing 32 and downstream of the desiccant section 36 in fluid flow direction inside the receiver drier, to position and maintain the suction tube 38 below the central axis O of the tubular casing 32. FIG. 5 illustrates an isometric view of the suction tube 38 along with the at least one retraining element 50. The at least one restraining element 50 is in the form of a planar element received inside the tubular casing 32 and configured with an aperture or a cut out portion 52 that receives the suction tube 38 to position and maintain the suction tube 38 below the central axis O of the tubular casing 32. Further, the at least one restraining element 50 is provided with at least one opening 54 to permit fluid flow across the at least one restraining element 50. However, the present invention is not limited to any particular configuration of the at least one restraining element 50 as far as the at least one restraining element 50 is capable of positioning and maintaining the suction tube 38 below the central axis O of the tubular casing 32. FIG. 4 illustrates an exploded view of the receiver drier 30.

The condensed refrigerant from which moisture and debris is removed in the receiver drier 30 and flowing through the suction tube 38 egresses the receiver drier 30 from the outlet port 34b. The outlet port 34b is in fluid communication with and supplies condensed refrigerant egressing the tubular casing 32 to the second core 120 through the jumper line 40.

With such configuration, the condensed refrigerant is separated and the suction tube 38 receives condensed refrigerant irrespective of the angular position of the vehicle. As the inlet 38a to the suction tube 38 is at the lowest point, the suction tube 38 receives condensed refrigerant in all conditions, such configuration ensures supply of the condensed refrigerant to the suction tube 38 in all conditions, and ultimately to the second core 120 in which the condensed refrigerant is sub-cooled. Specifically, such configuration of the suction tube 38 ensures sufficient supply of the refrigerant to the sub-cooling section of the condenser 100, irrespective of the angular displacement of the vehicle. More specifically, such configuration of the suction tube 38 mitigates any impact of angular displacement of the vehicle on performance of the condenser.

Several modifications and improvement might be applied by the person skilled in the art to the heat exchanger, particularly condenser as defined above and such modifications and improvements will still be considered within the scope and ambit of the present invention, as long the heat exchanger includes a first core, a second core, and a receiver drier. The first core includes a first pair of collectors for collecting and distributing the heat exchange fluid. Similarly, the second core includes a second pair of collectors for collecting and distributing the heat exchange fluid. The receiver drier is inter-positioned fluidly between the first and the second cores and include a tubular casing, an inlet port, an outlet port, a desiccant section and a suction tube. The inlet port and the outlet port are configured at opposite lateral ends of the tubular casing. The desiccant section is configured between the lateral ends and includes desiccant material. The suction tube configures fluid communication between the desiccant section and the outlet port. The receiver drier is disposed horizontally and the suction tube is configured to enable receiving of the fluid from a lower portion of the tubular casing defined below a central axis O of the tubular casing and upstream of the suction tube in direction of fluid flow in the receiver drier.

In any case, the invention cannot and should not be limited to the embodiments specifically described in this document, as other embodiments might exist. The invention shall spread to any equivalent means and any technically operating combination of means.

The invention claimed is:

1. A heat exchanger for a vehicle, the heat exchanger comprising:
   a first core and a second core comprising a first pair of collectors and a second pair of collectors, respectively, for a heat exchange fluid of the heat exchanger, at least the first pair of collectors being arranged vertically,
   a receiver drier inter-positioned fluidly between the first and second cores, the receiver drier comprising:
      a tubular casing,
      an inlet port and an outlet port configured at opposite lateral ends of the tubular casing,
      a desiccant section configured axially between the inlet port and the outlet port, relative to a central axis of the tubular casing, and adapted to receive a desiccant material; and
      a suction tube adapted to configure fluid communication between the desiccant section and the outlet port,
   wherein the receiver drier is disposed horizontally,
   wherein the suction tube is configured to enable receiving of the fluid from a lower portion of the tubular casing defined below the central axis of the tubular casing and upstream of the suction tube in a direction of fluid flow in the receiver drier, and
   wherein the suction tube includes an inlet that is placed axially between the outlet port and the desiccant section, along a single axial direction relative to the central axis of the tubular casing, and is adapted to receive the fluid inside the suction tube irrespective of an orientation of the vehicle.

2. The heat exchanger as claimed in claim 1, wherein the second core is disposed parallel to and behind the first core.

3. The heat exchanger as claimed in claim 1, wherein the desiccant section is defined between a pair of perforated end plates received in the tubular casing, wherein the pair of perforated end plates are adapted to permit ingress, egress and fluid flow through the desiccant section.

4. The heat exchanger as claimed in claim 1, wherein the outlet port is in fluid communication with and adapted to supply condensed refrigerant egressing the tubular casing to the second core through a jumper line.

5. The heat exchanger as claimed in claim 1, wherein the desiccant material is silica gel.

6. The heat exchanger as claimed in claim 1, further comprising: at least one restraining element adapted to be received inside the tubular casing and downstream of the desiccant section in the fluid flow direction inside the receiver drier to position and maintain the suction tube below the central axis of the tubular casing.

7. The heat exchanger as claimed in claim 6, wherein the at least one restraining element is provided with either one of an aperture and a cut-out adapted to receive the suction tube to position and maintain the suction tube below the central axis O of the tubular casing.

8. The heat exchanger as claimed in claim 6, wherein the at least one restraining element is provided with at least one opening to permit fluid flow across the at least one restraining element.

9. The heat exchanger as claimed in claim 1, wherein the desiccant section with the desiccant material received therein is positioned between filtering pads and corresponding perforated plates positioned inside the tubular casing.

10. The heat exchanger as claimed in claim 1, wherein the desiccant material is in the form of a desiccant bag retained inside the tubular casing between a distal end of the desiccant section and at least one of a filter body and a first lateral end of the opposite lateral ends with at least a portion of the desiccant bag received in the desiccant section.

11. The heat exchanger as claimed in claim 1, wherein the inlet to the suction tube promotes suction of the fluid inside the suction tube.

* * * * *